Jan. 19, 1965    A. F. BECKER    3,165,784
CAP FORMING DEVICE
Filed Feb. 3, 1961    3 Sheets-Sheet 1
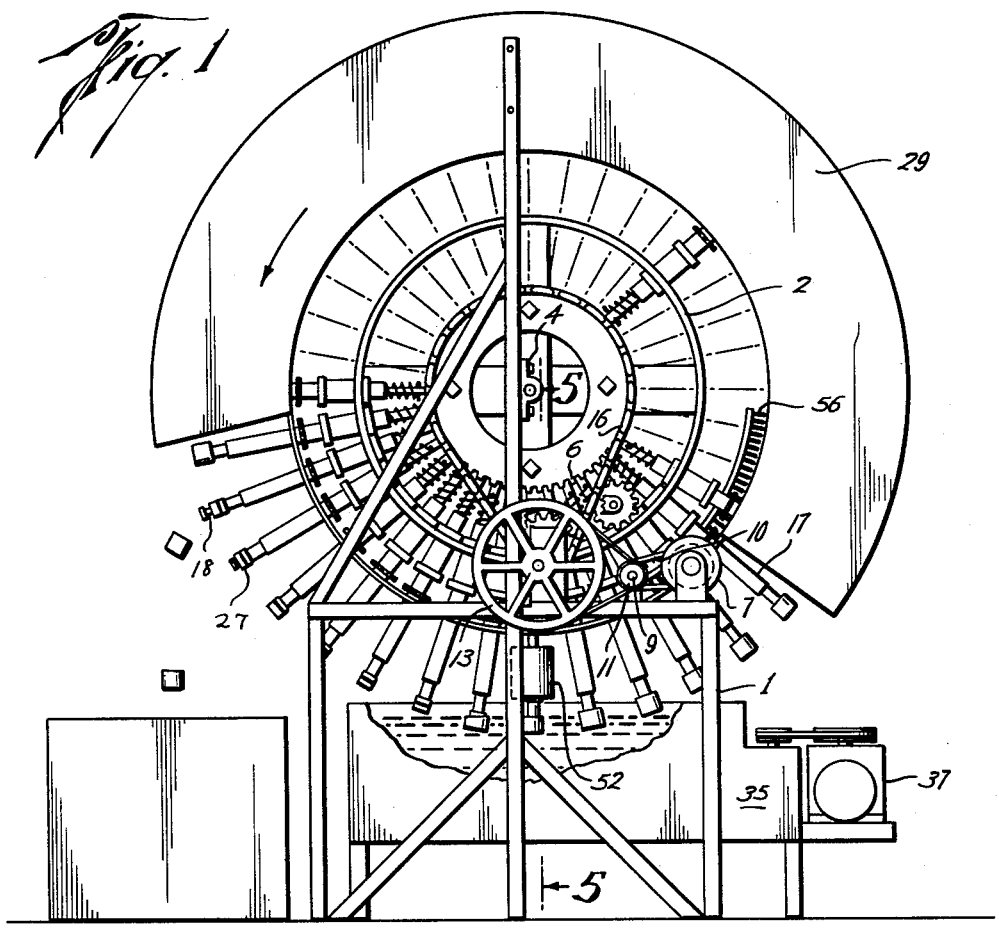
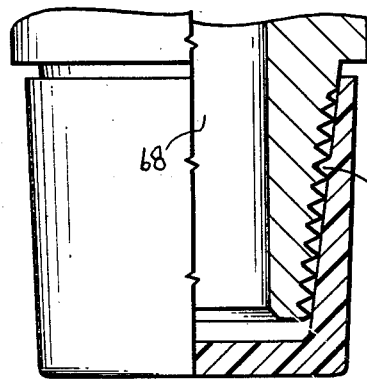
Anthony F. Becker
INVENTOR.
BY Ranseler O. Wyatt
ATTORNEY

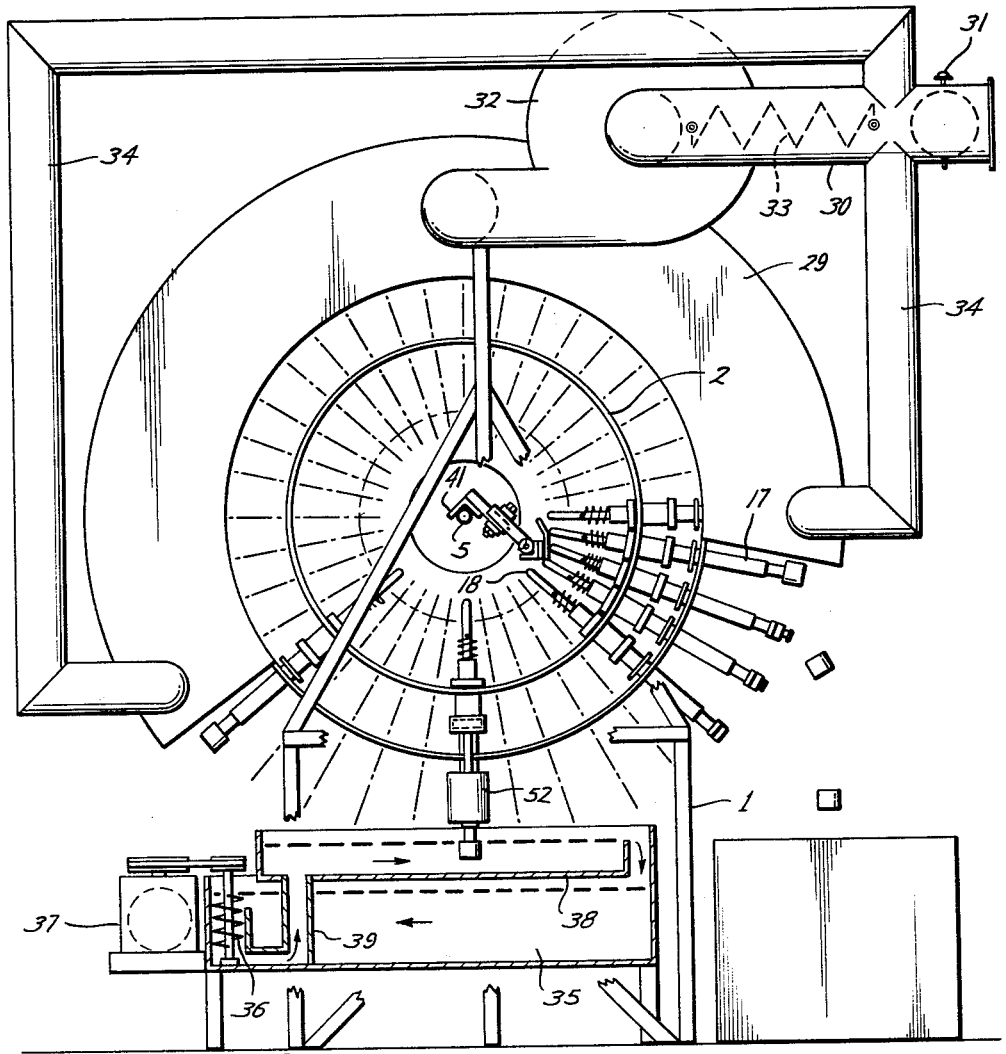
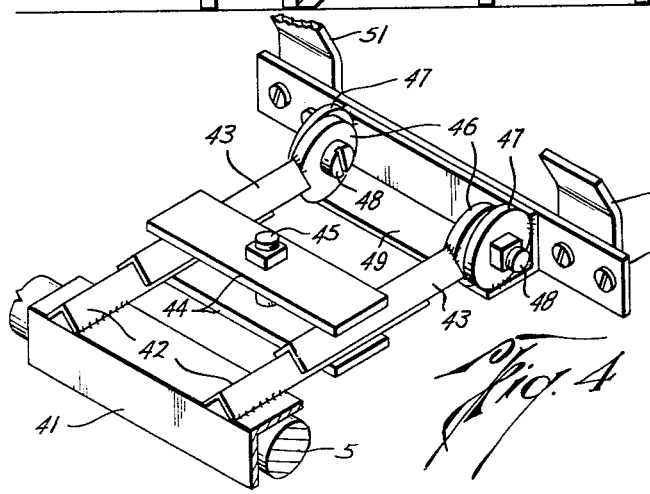
Fig. 3
Fig. 4
Anthony F. Becker
INVENTOR.
BY Ransler O. Wyatt
ATTORNEY

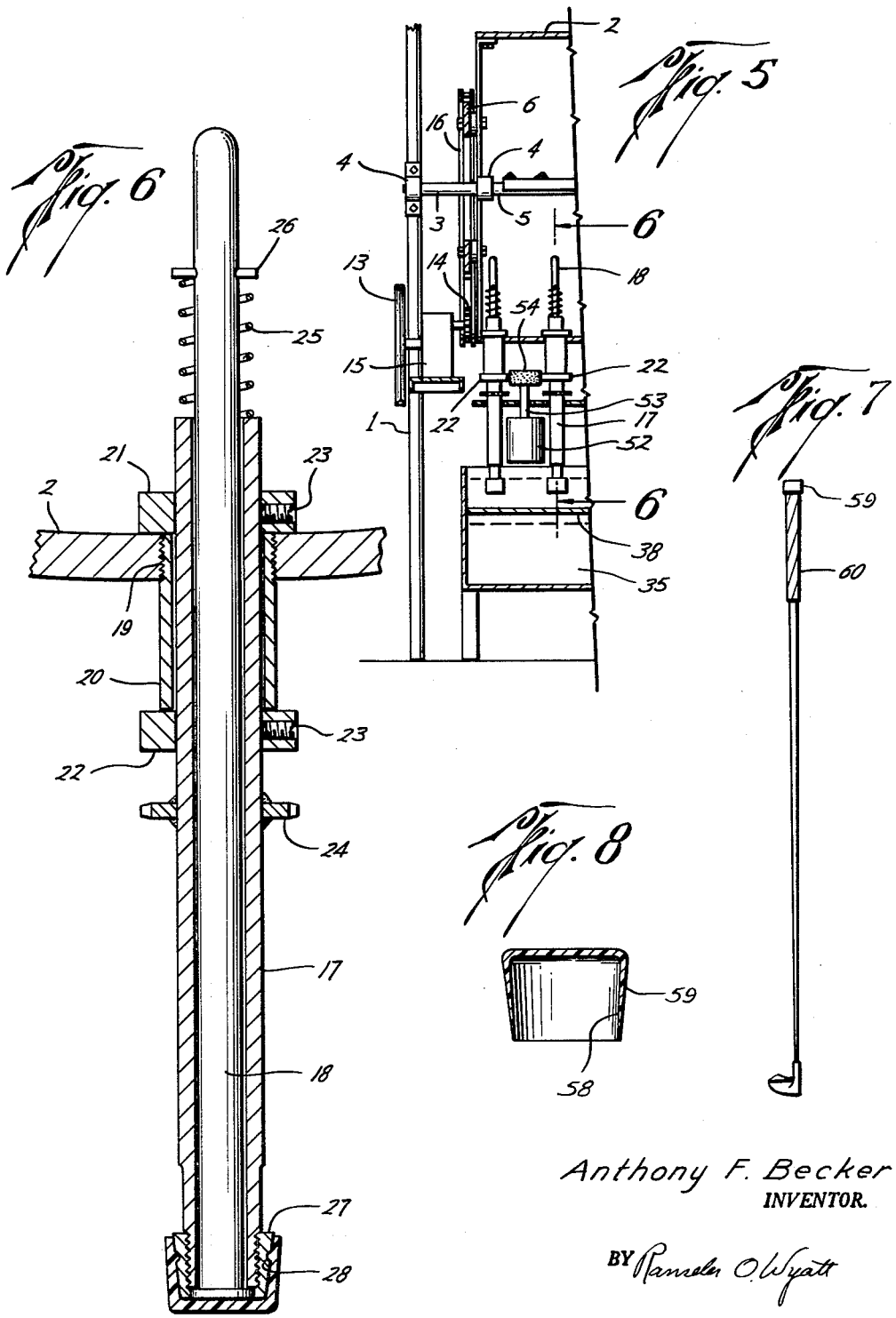

United States Patent Office

3,165,784
Patented Jan. 19, 1965

3,165,784
CAP FORMING DEVICE
Anthony F. Becker, 4377 Faculty Lane, Houston, Tex.
Filed Feb. 3, 1961, Ser. No. 86,925
2 Claims. (Cl. 18—24)

This invention relates to new and useful improvements in a cap forming device.

It is an object of the invention to provide a device for manufacturing caps, such as thread protecting caps, to be mounted on the threaded ends of sections of pipe while in transit, which will produce the articles desired rapidly and automatically.

It is another object of the invention to provide a device for manufacturing novel articles of plastic material having means for inserting a series of molds into a liquid plastic material in succession and forming a smooth coating of material on the molds and then passing same through a heating medium and removing the completed article from the molds.

It is still a further object of the invention to provide a device for manufacturing caps, and the like, having a series of molds mounted on a rotating wheel, having means for dipping the molds in succession into a liquid plastic, forming the article on the molds and setting the plastic and then discharging the articles from the molds as the wheel completes one rotation.

It is another object of the invention to provide a device for manufacturing caps, and the like, employing the novel method of rotating molds and inserting the molds into a liquid plastic and spinning the molds while in the liquid plastic, then setting the material adhering to the molds as the molds rotate and discharging the articles manufactured from the molds as the rotation is completed.

It is another object of the invention to provide a manufacturing device having a series of molds mounted on a rotating wheel, the molds being formed of telescoping sections, the inner section being movable longitudinally to bear against and eject the articles from the molds, and having a novel adjustable mold ejector actuator to effect ejection of the molded articles at a selected position of rotation of the wheel.

It is another object of the invention to provide a means for manufacturing caps and the like haivng a series of molds mounted on a rotating wheel, movable into and out of a tank containing liquid plastic, and means for constantly maintaining a predetermined depth of liquid in said tank and constantly agitating said liquid as the molds move into and out of the tank.

With the above and other objects in view, the invention has relation to certain novel features of construction, operating and arrangement of parts more particularly defined in the following specification and illustrated in the accompanying drawings, wherein:

FIGURE 1 is a side elevational view of the device, partially in cross section.

FIGURE 2 is an enlarged view, partially in cross section, of a thread protecting cap mounted on the threaded end of a section of pipe.

FIGURE 3 is a side elevational view of the device, partially in cross section, taken from the opposite side of the view shown in FIGURE 1.

FIGURE 4 is an enlarged perspective view of the ejector actuator mechanism employed.

FIGURE 5 is an enlarged, fragmentary cross sectional end view, taken on the line 5—5 of FIGURE 1.

FIGURE 6 is an enlarged cross sectional view, taken on the line 6—6 of FIGURE 5.

FIGURE 7 is a side elevational view of a golf club showing a cap mounted on one end thereof, and FIGURE 8 is a cross sectional elevational view of a cap for a golf club.

Referring now more particularly to the drawings, the numeral 1 designates a framework on which the rotating carrying wheel 2 is mounted by means of an axle 3 which is mounted in suitable bearings as 4, 4. A fixed axle 5 extends through the carrying wheel 2 and a ring gear 6 is mounted on the carrying wheel 2 and the carrying wheel 2 is rotated by means of a suitable motor 7, which may be mounted on the framework 1, and which rotates a pulley on the shaft 9 by means of the belt 10 and which in turn rotates the pulley 11 on the shaft 9, a belt 12 connecting the pulley 11 with the large pulley 13, which rotates the gear 14 through the gear box 15 and the chain 16, mounted on the gear 14 and the ring gear 6. A tension gear 57 is mounted on the framework 1 and is in mesh with the chain 16 to maintain the desired tension on the chain 16.

The pulleys on the shaft 9 may be of varied sizes to provide a selection of speed of rotation of the carrying wheel 2.

Radially mounted through the peripheral wall of the carrying wheel 2 are the molds, consisting of the housings 17 and the telescoping shafts 18. Internally threaded ports 19 are formed in the wheel 2 into which a tubular sleeve 20 is mounted, one end of the sleeve 20 being externally threaded for that purpose. The housing 17 is inserted through the sleeve 20 and maintained in the desired position by the rings 21, 22, which are anchored to the housing 17 by the countersunk set screws as 23, 23, the upper rings 21 abutting against the inside peripheral wall of the carrying wheel 2 and the lower rings 22 being adjacent the lower end of the sleeve 20. A gear 24 is mounted on the housing 17 below the ring 22 for a purpose to be hereinafter explained.

The telescoping shaft 18 has a yieldable means for constantly urging the shaft in retracted position as the spring 25, a pin 26 extending transversely through the shaft 18 as a stop for the upper end of said spring, the lower end of the spring 25 bearing against the upper end of the housing 17. The lower end of the housing 17 is reduced and externally threaded to receive the mold 27, such as the pipe protecting cap forming mold shown in FIGURE 6. This mold is tubular and internally threaded, and the outer side wall is tapered downwardly and a groove 28 is formed in the outside wall adjacent the upper end. The lower end of the shaft 18 is flanged and forms the closure for the mold 27.

Mounted on the framework 2 is the heating medium 29, which is an inclosed housing, through which the extended ends of the housings 17 pass. An air inlet conduit, 30, with a suitable control valve 31, extends into the blower 32 and a suitable heating element 33 is mounted in the conduit 30. Return conduits 34, 34 lead from the housing 29 adjacent the respective ends thereof and terminate in the inlet conduit 31 at a position therein so that the heated air from the housing 29 will be recirculated through the conduit 30 and subjected to reheating.

Beneath the carrying wheel 2 is a tank 35 in which a fluid plastic material may be maintained. The tank 35 is provided with a pump 36 and a motor to actuate same as 37, the pump 36 being a spiralled impeller mounted vertically in the tank 35 beneath the fluid level. The tank 35 has a partition 38 and a conduit 39 leads from the pump 36 to the area above the partition 38 and a barrier 40 at one end of the partition 38 maintains a fluid level in the tank 35. As the pump is actuated, the fluid in the tank 35 is constantly agitated and the fluid level above the partition 39 is maintained constant, the fluid being pumped therein overflowing the barrier 40 to return to the lower portion of the tank where it is again pumped into the area above the partition 38.

Mounted on the axle 5 is an actuating means for moving the shaft 18 in the housing 17 to eject a formed article from the mold 27. This actuating means consists of a base member, such as the angle iron 41 which is welded, or otherwise secured to the axle 5. Extending laterally from this base member are the shafts 42, 42 which may also be formed of angle iron, with the apex of the angle iron extending upwardly, the side margins of the angle irons 42, 42 being welded to the base member 41. Similarly positioned shafts, such as the angle irons 43, 43, are loosely mounted on the irons 42, 42, by fitting the sides of the irons 43, 43 on the irons 42, 42, in a superimposed relation, so that they will freely slide longitudinally. A suitable anchoring means may be employed to maintain the irons 43, 43 in the desired position on the irons 42, 42, such as the pair of parallel bars 44, 44 extending over the irons 42, 42 and 43, 43 and clamping same together as by means of the bolt and nut 45.

Mounted on the extended ends of the shafts 43, 43 are the discs 46, 46 and eccentrically mounted on the discs 46, 46 are the discs 47, 47, which are releasably maintained in place on the discs 46, 46 as by the bolts and nuts 48, 48. An angle iron 49 is welded or otherwise secured to the discs 47, 47 and the bar 50 similarly secured to the angle iron 49. Upwardly extended and rearwardly inclined contact members 51, 51 are mounted on the bar 50 adjacent the respective ends thereof. The bar 50 may be positioned by loosening the anchoring means 48, 48 and rotating the discs 47, 47 so that the inner ends of the shafts 18, 18 will contact the members 51, 51 and be moved longitudinally in the housings 17, 17 to bear against and eject the articles from the molds 27, as the carrying wheel 2 rotates.

Mounted in the framework 1, beneath the wheel 2, and in substantially vertical axial alignment, is a mold spinning means which may consist of the motor 52 having a drive shaft 53 and a disc 54 positioned to contact the rings 22, 22 on the housings 17, 17. Toothed gears 24, 24 are mounted on the housings 17, 17 and a rack 56 in the housing 29 is positioned to engage the gears 24, 24 and rotate the housings 17, 17 in the housing 29. The rack need extend into the housing 29 only sufficient distance to assure even setting of the plastic material.

Suitable molds, such as the thread protector cap mold 27, may be mounted on the extended ends of the housings 17 and the carrying wheel 2 rotated at the desired speed. As the wheel 2 rotates, the molds 27 will be dipped into the tank 35, the liquid plastic in the tank adhering to the mold 27; as the wheel 2 carries the housing 17 past the motor 52, the discs 54 contacts the discs 22, 22 on the housings 17 and applies a spin to the housings, causing the plastic to form a smooth, even coat on the molds 27, and as the wheel 2 continues to rotate, the molds 27 containing a coat of the plastic material from the tank, enter the heating housing 29 and the gears 55 on the housings 17, 17 mesh with the rack 56, imparting rotation to the molds 27 so that the plastic coat adhering thereto will set evenly. As the wheel 2 completes its rotation, the ends of the shafts 18 will contact the members 51 of the actuating means, and the shafts 18 will be moved longitudinally in the housings 17, moving the flanged end outwardly against the molded article and eject the molded article from the molds 27 as the wheel 2 continues its rotation, the molds 27 then again being dipped into the tank 35 and the process repeated.

The plastic material in the tank 35 may be any suitable liquid plastic such as polyvinylchloride, such as the product known as plastisol, which is a resin suspended, but not dissolved in a liquid. As this plastic passes into the heating housing 29, it is heated to fuse the liquid with the resin, which takes place at a heat of from 350 degrees to 375 degrees F. The liquid and the solvent become mutually solvent at that heat and thus fuse, and being flexible, may be readily removed from the mold by force from inside of the fused article.

The thread protector manufactured by this device, as shown in FIGURE 2, is formed with the annular bead 57 adjacent the open end of the inside wall surface, and the side walls are tapered, becoming gradually thinner from the closed end to the open end, so that the cap may be easily applied to the threaded end of a pipe section, the side wall adjacent the open end readily yielding to permit the bead 57 to pass over the pipe threads and to resist removal when the cap is forced on to the threaded end, 68.

The cap for golf clubs, as shown in FIGURES 7 and 8, is similarly formed, except that the mold necessary to form this cap is relatively small, when compared to the pipe thread protector, and the inside wall 58 is straight, the outside wall 59 being tapered towards the open end to a feather edge. The mold for forming this cap has straight side walls, the tapering of the walls of the cap being accomplished by the emersion into the plastic of the closed end first, and the consequent greater accumulation of plastic material on the closed end, and as the mold is passed through the tank 35, the surface level of the plastic in the tank being constant, the upper end of the mold will be emersed for a very short period. The cap thus produced may be easily mounted on the end of a golf club, passing over the end of the club and the end of the grip material 60, thus serving as a binder of the grip material as well as a protector against rain and the like, which might cause the grip material to loosen from the club, and which will protect the end seal of the club from damage due to dropping the club, as when returning it to the golf bag.

It is contemplated that other caps for other purposes may be formed by this device, requiring only change in the size and shape of the mold mounted on the housings 17.

The method sought to be taught hereby is that of mounting molds on a rotating wheel, and passing the molds through a tank containing a liquid plastic which is maintained at a constant level, spinning the molds as they pass through the tank, then passing the molds through a heating medium, and rotating the molds in the heating medium until the material has set, and ejecting the items as the wheel completes its rotation by application of pressure against the inside of the molded article.

While the foregoing is considered a preferred form of the invention and the novel articles of manufacture, they are by way of illustration only, the broad principle of the invention being defined by the appended claims.

What I claim is:

1. In a device for forming plastic articles of manufacture comprising a carrying wheel, a series of tubular housings radially mounted on said wheel, longitudinally movable shafts in said housings, molds on the extended ends of said housings, the extended ends of said shafts forming closures for said molds, a tank for liquid plastic beneath said wheel, means in said tank for maintaining a constant level of liquid therein, a heating means around said wheel above said tank comprising a housing inclosing said molds as said wheel rotates and a conduit extending from a point adjacent one end of said housing to a point adjacent the other end of said housing and a heating element in said conduit and an air circulating means for moving heated air through said housing and said conduit, means for rotating said wheel, means for passing said molds through said tank and said heating means, an adjustable shaft actuator within said wheel having super imposed V-shaped shafts and a clamp embracing said shafts for maintaining the actuator in a selected position, said actuator being adapted to contact and move said shafts longitudinally in said housings to eject the molded articles from said molds.

2. In a device for forming plastic articles of manufacture comprising a tank member to contain a fluid plastic material capable of being molded to shape, a rotatable wheel, a male mold member mounted on said wheel and adapted to be dipped in the material contained in the tank, means connected to one of the members and operable to impart motion thereto relative to the other member for effecting progressive immersion within and withdrawal from the fluid material for coating succeeding increments of mold surface to thicknesses differing in relation to different time intervals of their progressive immersion, means providing for solidification of the coating subsequent to immersion comprising an enclosure for the portion of said wheel above said tank, a conduit having one end mounted adjacent one end of said housing and the other end adjacent the other end of said housing, an air intake chamber in said conduit and a heating element in said chamber and a fan between and connected into said chamber and said housing and an ejector mechanism operable on a solidified coating to separate the same from the mold said ejector having a pair of superimposed shafts, one end of the lowermost shafts being anchored and the extended end of the uppermost shaft having a pivotally adjustable transverse bar, inclined guide members on said bar against which the mold members bear as the wheel rotates to eject the article from the mold.

References Cited in the file of this patent

UNITED STATES PATENTS

| | | |
|---|---|---|
| 1,365,528 | Mitzel | Jan. 11, 1921 |
| 2,021,299 | Gammeter | Nov. 19, 1935 |
| 2,041,788 | Sprunger | May 26, 1936 |
| 2,100,832 | Brating | Nov. 30, 1937 |
| 2,128,827 | Killian | Aug. 30, 1938 |
| 2,297,663 | Strassman | Sept. 29, 1942 |
| 2,299,269 | Gammeter | Oct. 20, 1942 |
| 2,638,632 | Glazer | May 19, 1953 |
| 2,704,668 | Park | Mar. 22, 1955 |
| 2,755,507 | Heller | July 24, 1956 |
| 2,772,090 | Brandon | Nov. 27, 1956 |
| 2,862,236 | Shapero | Dec. 2, 1958 |

OTHER REFERENCES

Ser. No. 337,675, Schmidberger (A.P.C.), published Apr. 27, 1943 (abandoned).